United States Patent
Manvar et al.

(10) Patent No.: US 11,256,499 B2
(45) Date of Patent: Feb. 22, 2022

(54) HOTFIX-FIRMWARE HAVING UPDATES TO A FIRMWARE AT RUNTIME

(71) Applicant: HEWLETT PACKARD ENTERPRISE DEVELOPMENT LP, Houston, TX (US)

(72) Inventors: Viratkumar Maganlal Manvar, Bangalore (IN); Kapil Porwal, Bangalore (IN); Jeke Kumar Gochhayat, Bangalore (IN); Raksha Sudhakar Shetty, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 82 days.

(21) Appl. No.: 16/722,392

(22) Filed: Dec. 20, 2019

(65) Prior Publication Data

US 2021/0191712 A1    Jun. 24, 2021

(51) Int. Cl.
  *G06F 9/44* (2018.01)
  *G06F 8/654* (2018.01)
  *G06F 9/48* (2006.01)

(52) U.S. Cl.
  CPC .......... *G06F 8/654* (2018.02); *G06F 9/4812* (2013.01); *G06F 2209/486* (2013.01)

(58) Field of Classification Search
  CPC ... G06F 8/654; G06F 9/4812; G06F 2209/486
  USPC ................. 717/120–123, 168–178
  See application file for complete search history.

(56) References Cited

U.S. PATENT DOCUMENTS

| 8,082,543 | B2 | 12/2011 | Ford |
| 8,185,886 | B2 | 5/2012 | Rothman et al. |
| 9,348,730 | B2 * | 5/2016 | Odlivak ............. G06F 11/3628 |
| 9,483,246 | B2 * | 11/2016 | Prakash ............. G06F 21/572 |
| 10,101,988 | B2 | 10/2018 | Ford et al. |

(Continued)

OTHER PUBLICATIONS

Zimmer, "Developing Best-in-Class Security Principles with Open Source Firmware", 2015, Intel, 65 pages. (Year: 2015).*

(Continued)

*Primary Examiner* — Ted T. Vo
(74) *Attorney, Agent, or Firm* — Hewlet Packard Enterprise Patent Department

(57) ABSTRACT

Example implementations relate to method and system for storing and applying updates to a firmware at runtime of a processor-based system. The processor-based system includes a system management (SM) memory, a platform hardware, a main processor, the firmware, and a hotfix-framework. The hotfix-framework includes a hotfix dispatcher module and a service driver module having one or more boot time resources. The firmware and the hotfix-framework are pre-executed in the SM memory. The platform hardware stores a hotfix-firmware including updates to the firmware into a memory of the processor-based system, and generates an interrupt to direct the main processor into an SM mode and get the hotfix-framework notification about the hotfix-firmware. The hotfix dispatcher module loads the hotfix-firmware from the memory into the SM memory, and executes the hotfix-firmware by utilizing the one or more boot time resources to apply the updates to the firmware at runtime of the processor-based system.

12 Claims, 5 Drawing Sheets

(56) References Cited

U.S. PATENT DOCUMENTS

| | | | |
|---|---|---|---|
| 2009/0019435 A1* | 1/2009 | Piechowski | G06F 8/65 |
| | | | 717/176 |
| 2013/0086571 A1 | 4/2013 | Dasari et al. | |
| 2015/0355897 A1 | 12/2015 | Ford et al. | |
| 2019/0243637 A1 | 8/2019 | Nachimuthu et al. | |

OTHER PUBLICATIONS

Ekman et.al., "Dynamic Patching of Embedded Software", 2007, IEEE, 9 pages. (Year: 2007).*
Bazhaniuk et al., "Symbolic execution for BIOS security", 2015, Intel, 10 pages. (Year: 2015).*
Michael Copeland, "The Cost of IT Downtime", available online at <https://www.the20.com/blog/the-cost-of-it-downtime/>, Jun. 18, 2018, 2 pages.

* cited by examiner

HOTFIX-FIRMWARE HAVING UPDATES TO A FIRMWARE AT RUNTIME

BACKGROUND

Modern processor-based system, such as computers and computer-based systems typically include firmware, i.e., code (representing instructions and non-instruction-type data) stored in non-volatile firmware memory and used for initializing and low-level functionality of the processor-based system. Typically, the firmware is loaded into relatively fast volatile memory for use.

It is sometimes desirable to update the firmware, e.g., to fix firmware bugs, to add features, or to tweak system parameters. In older processor-based systems, updating the firmware may involve swapping out one firmware read-only-memory (ROM) encoded with the firmware with another ROM encoded with an updated firmware. More recently, firmware is stored in rewritable non-volatile memory, such as electrically erasable and programmable (EEPROM), flash memory, battery backed non-volatile memory of the modern processor-based system, so that the firmware updates may be updated in place without swapping the memory. However, such updates can take effect only when the processor-based system is reinitialized, i.e., rebooted.

BRIEF DESCRIPTION OF THE DRAWINGS

Various examples will be described below with reference to the following figures.

DETAILED DESCRIPTION

Figure 1:
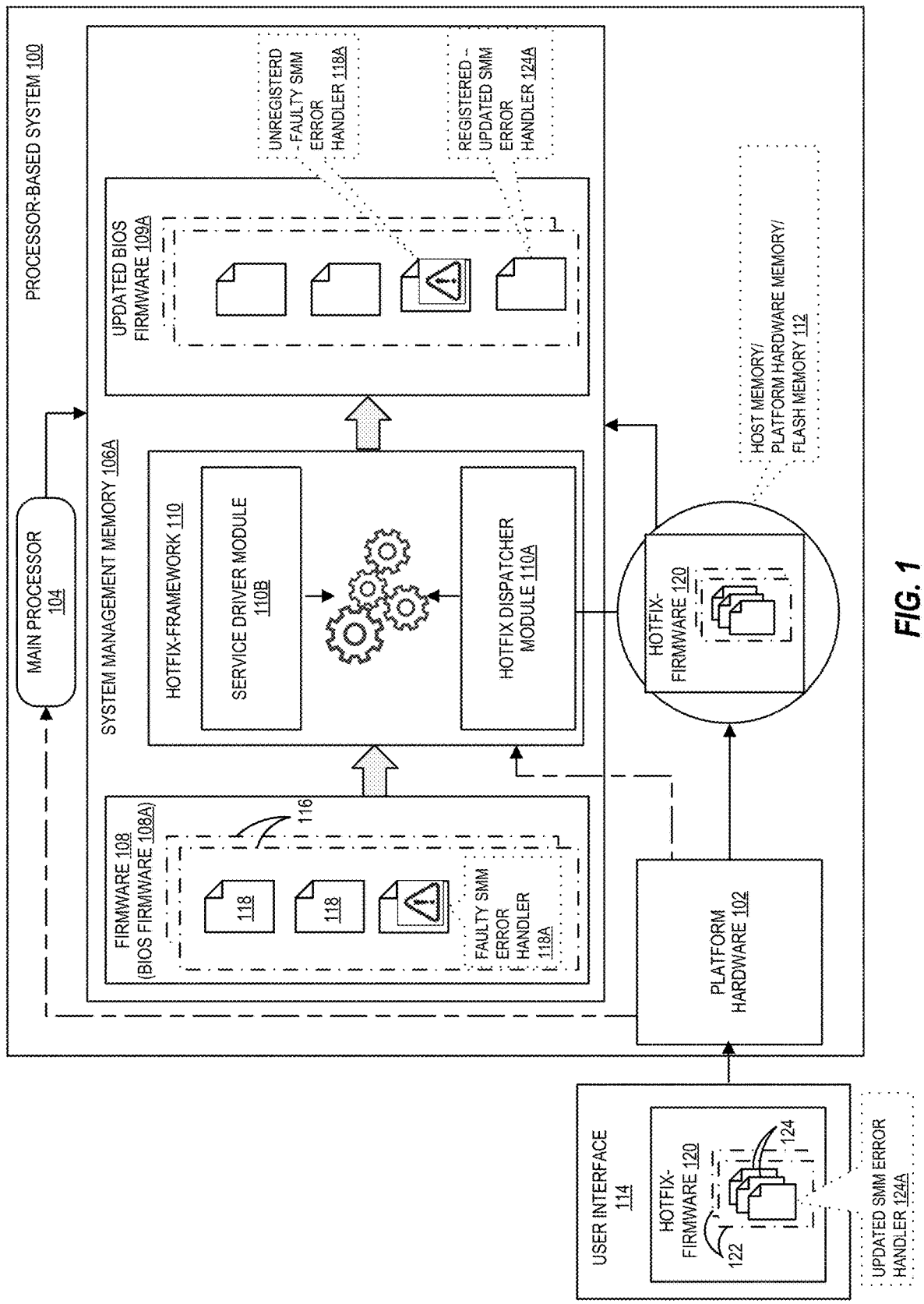
FIG. 1 is a block diagram depicting a processor-based system, in which a firmware is updated at runtime, in accordance with embodiments of the present disclosure.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. As used herein, the term "includes" means includes but not limited to, the term "including" means including but not limited to. The term "based on" means based at least in part on.

The present disclosure relates generally to data processing in a processor-based system and, more specifically, to method and system for loading and executing a hotfix-firmware having updates to a firmware at runtime of a processor-based system. In some example embodiments, the present disclosure describes storing and executing the hotfix-firmware by using a hotfix-framework to apply the updates to the firmware at runtime. The disclosed examples may include systems, devices, computer-readable storage media, and methods for loading and executing the hotfix-firmware so as to apply the updates to the firmware at runtime, certain examples are described with reference to the components illustrated in FIGS. 1-5. The functionality of the illustrated components may overlap, however, and may be present in a fewer or greater number of elements and components.

Figure 4:
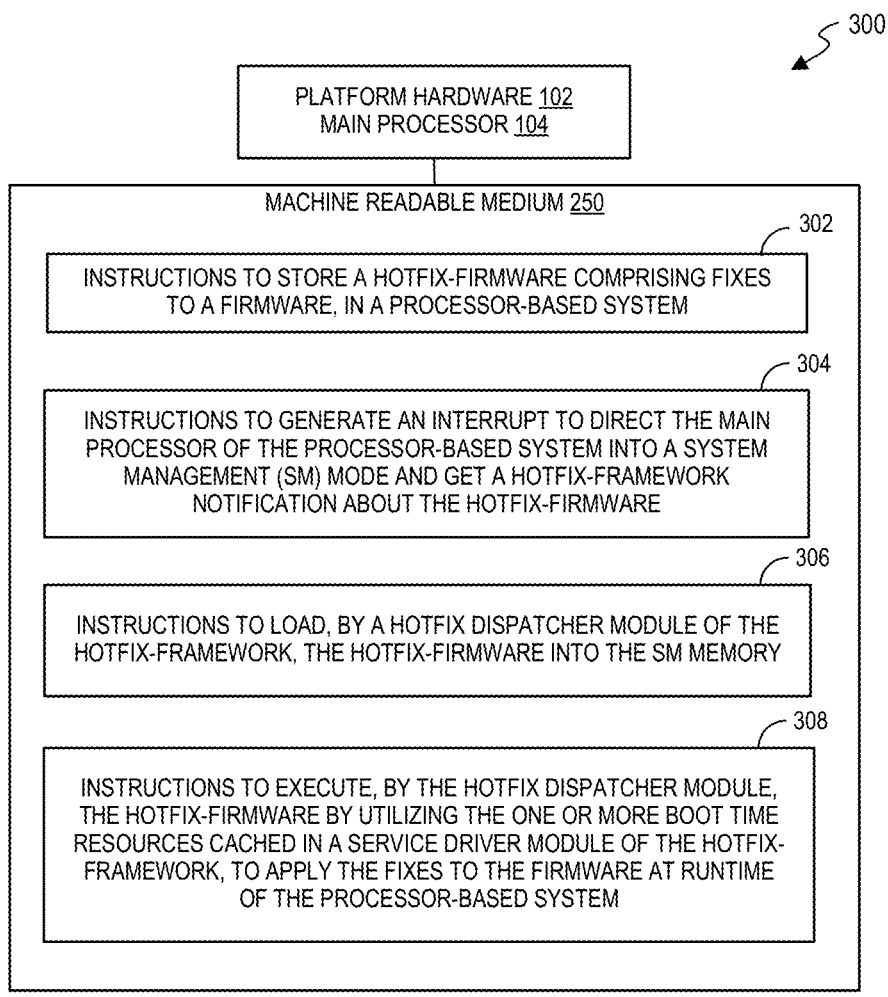
FIG. 4 is a block diagram depicting a main processor, a platform hardware, and a machine readable medium encoded with example instructions to load and execute a hotfix-firmware having updates to a firmware at runtime of a processor-based system, in accordance with one embodiment of the present disclosure.
Figure 5:
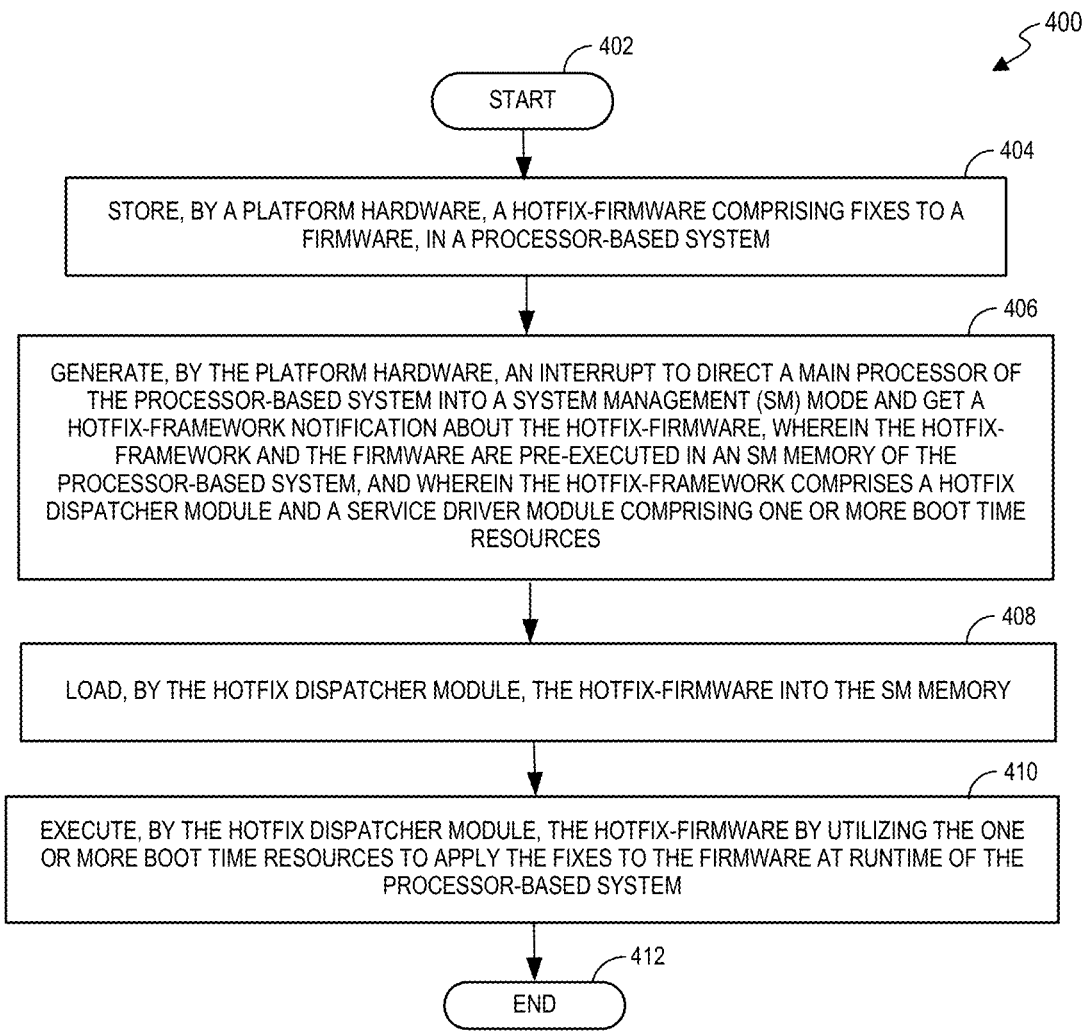
FIG. 5 is a flow diagram depicting an example method to load and execute a hotfix-firmware having updates to a firmware at runtime of a processor-based system, in accordance with one embodiment of the present disclosure.

The sequence of operations described in connection with FIGS. 4-5 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

Platform firmware such as a unified extensible firmware interface (UEFI) or basic input/output system (BIOS) is a type of firmware of the processor-based system, for example, computers, computer-based systems, servers and the like. Generally, BIOS is used to initialize motherboard and its components, when the processor-based system is started or rebooted. It is sometimes desirable to update the firmware, e.g., to fix the firmware issues, to add new features to the processor-based system, or to tweak parameters of the processor-based system. Conventionally, updating the BIOS included loading an updated BIOS in a flash memory or a non-volatile memory of the processor-based system. Further, the processor-based system may need to be rebooted to apply the updated BIOS or to take the updated BIOS into effect. Thus, resulting in stopping the workload, which causes downtime. For example, in a mission-critical context, such as network-supported medical alert and other emergency services, financial transactions, and online retailing, in which the processor-based system is expected to be "highly available," rebooting the processor-based system to complete the installation of the firmware, e.g., BIOS can be costly. Thus, resulting in revenue losses to the organization, reputation, and advantage to competition.

Examples disclosed herein address the aforementioned problems, by allowing firmware updates (e.g., a hotfix-firmware) to be loaded into a secure environment, and executed using a pre-executed and secured hotfix-framework, for applying the updates to the firmware at runtime. More particularly, the technical solution to the aforementioned problems may leverage the hotfix-framework, to effectively store and apply the updates, which are present in the hotfix-firmware, to the firmware without rebooting the processor-based system. In particular, the hotfix-framework loads the hotfix-firmware into the SM memory, and executes the hotfix-firmware by utilizing one or more boot time resources to apply the updates to the firmware at runtime. This not only saves costs associated with downtime, but also encourages wider use of firmware updates, e.g., enhancing performance of the processor-based system by updating system parameters, or updating component firmware, or updating processor internal firmware. Further, the hotfix-framework, which is pre-executed in the SM memory, facilitates the process for loading and executing the hotfix-firmware independent and transparent of the operating system. Additionally, in some exemplary embodiments, a platform hardware, for example, a management processor stores the hotfix-firmware in a management processor memory before the hotfix-framework stores the hotfix-firmware to the SM memory, to subside the security risks to the hotfix-firmware from the operating system and applications running on the operating system.

In some examples, the hotfix-framework may load and/or execute a portion of the hotfix-firmware during the interrupt. In such examples, the hotfix-framework may register/request the platform hardware to generate scheduled interrupts, such that the hotfix-framework may load and/or execute remaining portions of the hotfix-firmware during the scheduled interrupts. Thus, the hotfix-framework optimizes the process of updating the firmware by loading and/or executing portions of the hotfix-firmware during scheduled interrupts, thereby subsiding stalling of the workload (e.g., operating system and application running on the operating system) and the associated downtime. In some other examples, the platform hardware and/or the hotfix-framework may additionally perform signing verification of the hotfix-firmware to validate integrity of the hotfix-firmware before and after loading the hotfix-firmware into the SM memory.

In one or more embodiments, the hotfix-firmware includes runtime updates for the firmware code, which is executed even after the operating system of the processor-based system, has been initialized. The hotfix-framework may be used to update the firmware, such as a basic input/output system (BIOS) firmware, a component firmware, or a processor internal firmware, and the like using the hotfix-firmware. In some examples, the hotfix-firmware may include updates to at least one unified extensible firmware interface (UEFI) run-time service, at least one system management service, and the like.

FIG. 1 is a block diagram depicting a processor-based system 100 in accordance with embodiments of the present disclosure. In some examples, the processor-based system 100 may be computers, computer-based systems, servers, and the like. In the illustrated embodiment, the processor-based system 100 includes a platform hardware 102, a main processor 104, and a system management (SM) memory 106A.

The platform hardware 102, in some examples is a management processor, such as an Integrated Lights-Out (iLO) or a baseboard management controller (BMC.) In some other examples, the platform hardware 102 may be a platform controller hub (PCH). The platform hardware 102 may provide an interface 114 for users to interact with the processor-based system 100. In the example embodiment of FIG. 1, the platform hardware 102 is shown to be an integral component of the processor-based system 100. However, in some other example embodiments, the platform hardware 102 may be a discrete component residing in another processor-based system. In such example embodiments, the platform hardware 102 may be operably coupled to processor-based system 100 via a network, such as TCP/IP (Transmission Control Protocol/Internet Protocol) network, which is a suite of communication protocols used to interconnect network devices on internet. In some examples, the BMC may be another processor separate from the main processor 104 that is configured to execute a host operating system. Further the BMC may be capable to be powered using an auxiliary power rail such that the BMC can be powered and active even when the processor-based system 100 is in an off mode.

The main processor 104 may be a physical processor. In some examples, the physical processor may be at least one of a central processing unit (CPU,) a graphics processing unit (GPU,) a microprocessor, and/or other hardware devices suitable for performing the functionality described in relation to FIGS. 1 and 2A-2C.

Figure 2A:
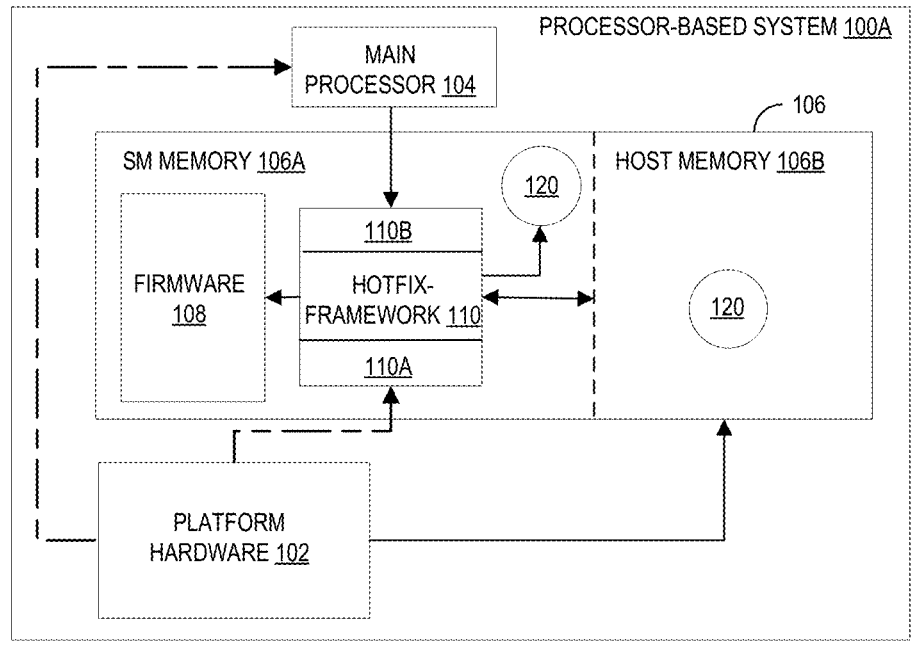
FIG. 2A is a block diagram depicting a processor-based system, in which a hotfix-firmware is loaded and executed using a hotfix-framework to update the firmware at runtime, in accordance with one embodiment of the present disclosure.
Figure 2B:
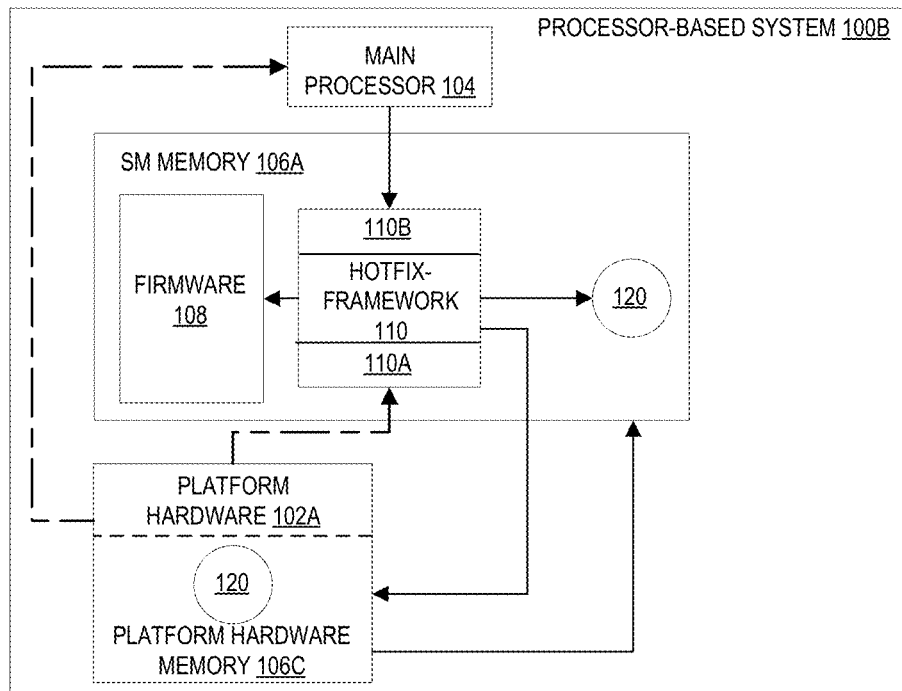
FIG. 2B is a block diagram depicting a processor-based system, in which a hotfix-firmware is loaded and executed using a hotfix-framework to update the firmware at runtime, in accordance with another embodiment of the present disclosure.
Figure 2C:
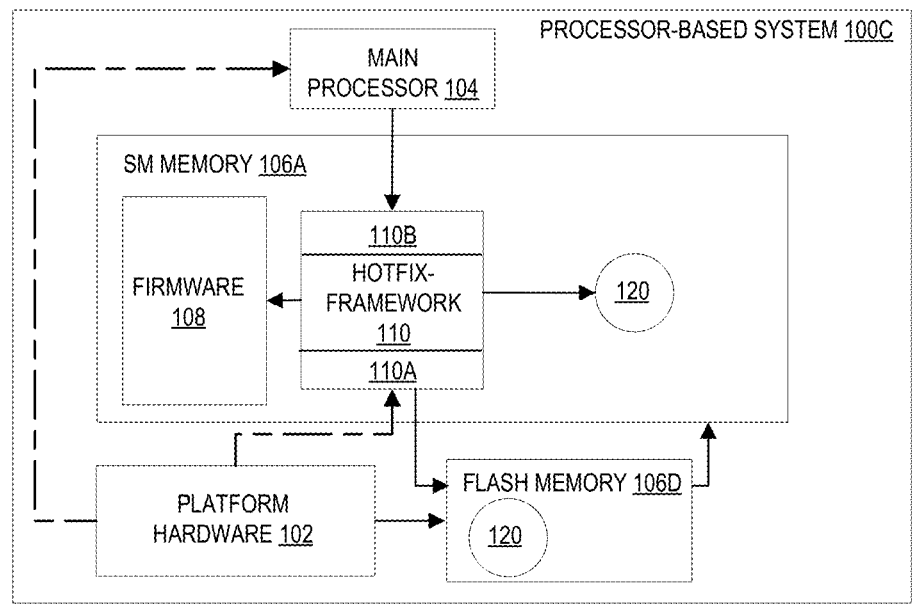
FIG. 2C is a block diagram depicting a processor-based system, in which a hotfix-firmware is loaded and executed using a hotfix-framework to update the firmware at runtime, in accordance with yet another embodiment of the present disclosure.

The SM memory 106A is a dedicated or reserved memory within a random-access memory 106 (RAM, as shown in FIG. 2A) of the processor-based system 100. It may be noted herein that RAM 106 may be alternatively referred to as a "main memory" of the processor-based system 100. In other words, the SM memory 106A is a portion of the main memory 106 accessed by the main processor 104 to store and/or execute codes or program instructions during a system management (SM) mode. In one or more embodiments, the SM memory 106A is encoded with the program instructions corresponding to a firmware 108 and a hotfix-framework 110. In some examples, the firmware 108 is a basic input/output system (BIOS) firmware 108A. In one or more embodiments, the BIOS firmware 108A and the hotfix-framework 110 are initially flashed in a flash memory 106D (as shown in FIG. 2C) of the processor-based system 100, using the platform hardware 102, for example, a management processor, such as a baseboard management controller. The BIOS firmware 108A and the hotfix-framework 110 are executed (pre-executed) from the flash memory 106D during booting (or rebooting) of the processor-based system 100, such that the program instructions corresponding to the BIOS firmware 108A and the hotfix-framework 110 are stored in executable form in the SM memory 106A.

The BIOS firmware 108A includes executable program instructions to perform hardware initialization of the processor-based system 100 during booting (or rebooting), and provide runtime services to workload of the processor-based system 100. In some examples, the workload may be an operating system and programs (or applications) running on the operating system. Generally, the BIOS firmware 108A includes components active at boot time of the processor-based system 100, and components active at runtime of the processor-based system 100. The boot time components performs the hardware initialization and setting up platform for the operating system to take control, and the runtime components provides runtime services to the workload. In some examples, the runtime components includes system management mode (SMM) infrastructure components including SMM protocols, registered SM interrupt handlers, and SMM drivers 116. In some non-limiting examples, each of the SMM drivers 116 may include one or more SMM handlers 118, for example, SMM error handlers, advanced configuration and power interface (ACPI) support handlers, and handlers for secure access to unified extensible firmware interface (UEFI) variables, and the like. Further, each of the one or more SMM handlers 118 may be associated to manage at least one task in the processor-based system 100. In the illustrated embodiment of FIG. 1, one handler, for example, a SMM error handler of one or more SMM handlers 118 may have a fault and it is referred to as a faulty SMM error handler 118A, for example. Generally, the SMM error handler may be used to report and act on hardware errors in the processor-based system 100. However, the faulty SMM error handler 118A may fail to act or report the hardware errors appropriately, thereby necessitating replacement.

The hotfix-framework 110 is a framework of program instructions, which when executed by the main processor 104, during SMM mode or while booting may perform a plurality of functions, such as loading and executing a hotfix-firmware 120 stored in the processor-based system 100. In some examples, the hotfix-framework 110 includes a hotfix-dispatcher module 110A and a service driver module 110B. The hotfix dispatcher module 110A is constructed based on standard UEFI BIOS architecture having capabilities to parse, locate, read, store, and execute the hotfix-firmware 120. The service driver module 110B may function as a registry to provide one or more boot time resources to the hotfix dispatcher module 110A during executing the hotfix-firmware 120. In some examples, the one or more boot time resources are cached using one or more boot time services (components) during booting of the processor-based system 100. In some non-limiting examples, the one or more boot time resources may include platform configuration data (PCD), hand-off block (HOB,) data and functionality provided by boot time services, and the like.

The hotfix-firmware 120 includes a plurality of hotfix drivers 122 including updates 124, for example, one or more updated SMM handlers to the one or more runtime components of the BIOS firmware 108A. It should be noted herein that "hotfix driver" is a type of a SMM driver used i) to update one or more existing SMM handlers or ii) to update parameters of the processor-based system 100 or iii) to add a new SMM handler. In some non-limiting examples, the one or more SMM handlers may include the SMM error handlers, ACPI support handlers, and the like. Similarly, the one or more system parameters of the processor-based system 100 may include model specific register (MSR), UEFI variables, environment variables, and the like. In some example embodiments, the updates 124 in the hotfix driver 122 may be applied to the one or more SMM handlers 118 of the SMM drivers 116. In the illustrated embodiment of FIG. 1, at least one hotfix driver of the plurality of hotfix drivers 122 includes updates in the form of an updated SMM error handler 124A to the faulty SMM error handler 118A of at least one SMM driver of the plurality of SMM drivers 116, for example.

In some embodiments, the processor-based system 100 may further include a memory 112 operably coupled to the platform hardware 102 and the hotfix-framework 110. In one example embodiment, the memory 112 may be a host memory 106B (as shown in FIG. 2A.) In such example embodiment, the host memory 106B may be another portion of the main memory 106. In other words, the combination of SM memory 106A and the host memory 106B may together constitute the main memory 106 of the processor-based system 100. In another example embodiment, the memory 112 may be a platform hardware memory 106C (as shown in FIG. 2B.) In such example embodiment, the platform hardware memory 106C may be integral component of the platform hardware 102. In yet another example embodiment, the memory 112 may be the flash memory 106D (as shown in FIG. 2C) of the processor-based system 100.

In one embodiment, the platform hardware 102 is operably coupled to the main processor 104 and the hotfix-framework 110. Further, the main processor 104 is coupled to the SM memory 106A. The platform hardware 102 provides the interface 114 for the user, for example, an administrator to interact with the processor-based system 100.

During operation, the user may program or input the hotfix-firmware 120 including the plurality of hotfix drivers 122, for example, as binaries into the processor-based system 100 via the interface 114 of the platform hardware 102. In some embodiments, the user may first segregate updates to the BIOS firmware 108A, into two categories before inputting the updates into the processor-based system 100. In some examples, the first category may include boot time updates which needs to be applied during power on sequence of the processor-based system 100 for hardware initialization for the first time, which are dependent on hardware state, and which cannot be applied at the runtime i.e., once the operating system is running. The other category may include runtime updates which do not depend on any boot time components, which can be applied when hardware is in initialized state, and which can take effect at runtime immediately after applying the updates. It should be noted herein that the hotfix-firmware 120 includes runtime updates, as discussed herein. Since, the BIOS firmware 108A as illustrated in the embodiment of FIG. 1, includes the faulty SMM error handler 118A, the hotfix-firmware 120 of the present disclosure provides the updated SMM error handler 124A as the update to the faulty SMM error handler 118A, which can be applied at runtime.

The platform hardware 102 may store the hotfix-firmware 120 into the memory 112 of the processor-based system 100. As discussed herein, the memory 112 may be one of the host memory 106B, the platform hardware memory 106C, or the flash memory 106D. The platform hardware 102 may subsequently generate an interrupt, for example, the SM interrupt to direct the main processor 104 into the SM mode and get the hotfix-framework 110 notification about the hotfix-firmware 120 in the processor-based system 100. Since, the SMM infrastructure is active at runtime, it is possible to load and apply the hotfix-firmware 120 including the updates, for example, the updated SMM error handler 124A in the SMM infrastructure at runtime to take effect immediately without rebooting the processor-based system 100. Thus, when the processor-based system 100 enters into the SM mode, all cores/threads of the main processor 104 may enter into the SM mode and no activity may take place in the operating system. It should be noted herein that the memory 112 in which the hotfix-firmware 120 will be stored by the platform hardware 102, is predetermined (in accordance to the specific type of implementation) and that information about the predetermined memory may be updated in the hotfix-framework 110. Thus, the hotfix-framework 110 may directly access the predetermined memory to load the hotfix-firmware 120 into the SM memory 106A.

Further, the hotfix dispatcher module 110A may be executed by the main processor 104 to load the hotfix-firmware 120 from the memory 112 into the SM memory 106A. In one embodiment, loading the hotfix-firmware 120 may include storing all of the plurality of hotfix drivers 122 from the memory 112 into the SM memory 106A during the interrupt. In some example embodiments, the hotfix-framework 110 may allocate a buffer into SM memory 106A to store the hotfix-firmware 120. The buffer may be allocated from the free pool of the SM memory 106A.

In another embodiment, loading the hotfix-firmware 120 may include storing at least one hotfix driver of the plurality of hotfix drivers 122 from the memory 112 into the SM memory 106A during the interrupt. In such embodiments, the hotfix dispatcher module 110A may request the platform hardware 102 to generate scheduled interrupts. During each of the scheduled interrupts, the hotfix dispatcher module 110A may store another hotfix driver of the plurality of hotfix drivers 122 from the memory 112 into the SM memory 106A, until all of the remaining hotfix drivers of the plurality of hotfix drivers 122 are stored from the memory 112 into the SM memory 106A.

In yet another embodiment, loading the hotfix-firmware 120 may include storing predetermined size of the plurality of hotfix drivers 122 from the memory 112 into the SM memory 106A during the interrupt. In such embodiments, the hotfix dispatcher module 110A may request the platform hardware 102 to generate scheduled interrupts. During each of the scheduled interrupts, the hotfix dispatcher module 110A may store another predetermined size of the plurality of hotfix drivers 122 from the memory 112 into the SM memory 106A, until all of the remaining hotfix drivers of the plurality of hotfix drivers 122 are stored from the memory 112 into the SM memory 106A. In one or more embodiments, the scheduled interrupts may be periodic interrupts, for example, one interrupt in every five millisecond. It should be noted herein that storing the plurality of hotfix drivers 122 during each of the scheduled interrupts may reduce stalling the workload running on the operating system for longer duration. In some examples, the platform hardware 102 may perform the signing verification of the hotfix-firmware 120 to validate integrity of the hotfix-firmware 120 before storing the hotfix-firmware 120 into the memory 112. Similarly, the hotfix-framework 110 may also perform the signing verification of the hotfix-firmware 120 to validate integrity of the hotfix-firmware 120 before and after storing the hotfix-firmware 120 from the memory 112 into the SM memory 106A.

Further, the hotfix dispatcher module 110A may be executed by the main processor 104 to execute the hotfix-firmware 120 from the SM memory 106A. In particular, the hotfix dispatcher module 110A may execute the hotfix-firmware 120 by utilizing the one or more boot time resources to apply the updates to the BIOS firmware 108A at runtime of the processor-based system 100.

In the illustrated embodiment, executing the hotfix-firmware 120 includes executing the hotfix driver 122 including library constructors and module entry point functions to i) locate at least one faulty handler 118A among the plurality of pre-executed drivers 116 (i.e., SMM drivers) of the BIOS firmware 108A, ii) unregister the at least one faulty handler, for example, faulty SMM error handler 118A from the existing event, and iii) register at least one updated handler, for example, the updated SMM error handler 124A to the existing event such that the BIOS firmware 108A is updated to an updated BIOS firmware 109A. The term "pre-executed drivers" means existing SMM drivers that are executed during booting of the processor-based system 100. In some example embodiments, the module entry point of the hotfix driver 122 having the updated SMM error handler 124A may locate the faulty SMM error handler 118A in the SM memory 106A using globally unique identifier (GUID), unregister the faulty SMM error handler 118A, and register the updated SMM error handler 124A with the same GUID. Thus, the faulty SMM error handler 118A is no more in use and is inactivated. Once all the plurality of hotfix drivers 122 are processed (executed) successfully, the hotfix-firmware 120 is considered to be applied successfully to the BIOS firmware 108A at runtime.

It should be noted herein, the SMM drivers 116 dispatched during booting of the processor-based system 100, may initialize global data structures, install SMM protocols, and register SMI handlers, and the like in the module entry point of the SMM driver. All of these functionalities may possibly use some boot time services. Therefore, the library constructor and module entry point functions may not be able to execute properly at runtime due to dependency on such boot time components. Thus, the service driver module 110B having cached in the one or more boot time resources during booting of the processor-based system 100, may provide necessary support for the library constructor and module entry point functions of the plurality of hotfix drivers 122 to execute the hotfix-firmware 120 properly at runtime.

In one embodiment, executing the hotfix-firmware 120 may include executing all of the plurality of hotfix drivers 122 from the SM memory 106A during the interrupt. In another embodiment, executing the hotfix-firmware 120 may include executing at least one hotfix driver of the plurality of hotfix drivers 122 from the SM memory 106A during the interrupt. In such embodiments, the hotfix dispatcher module 110A may request the platform hardware 102 to generate scheduled interrupts. During each of the scheduled interrupts, the hotfix dispatcher module 110A may execute another hotfix-driver of the plurality of hotfix-drivers 122 from the SM memory 106A, until all of the remaining hotfix drivers of the plurality of hotfix drivers 122 are executed from the SM memory 106A to apply the updates to the BIOS firmware 108A at runtime. The hotfix dispatcher module 110A may keep a track of the executed hotfix drivers and hotfix drivers, which are yet to be executed so as to properly execute all of the plurality of hotfix drivers 122.

In some embodiments, executing the hotfix-firmware 120 includes registering at least one new handler to one or more of an existing event or a new event, or modify one or more parameters of the processor-based system 100.

In some example embodiments, the at least one new handler, such as, a single bit correctable error (SBCE) handler may be used for registering to the existing event or the new event. As it commonly known that dynamic random-access memory (DRAM) is a volatile storage medium, generally made of small capacitors and the data on it is retained by refreshing/overwriting the existing data. At times, there may be chance of data corruption/distortion during such retention process. Memory controllers may employ recovery mechanism to recover data by detecting and fixing single bit corruption during a read cycle. If the frequency of data corruption is high, then it is likely to fail again in future. The BIOS firmware 108A may need to track such corruptions (although recovered) to identify pattern of these corruptions so that it may notify the user of the processor-based system 100 about frequently failing DRAM of dual in-line memory module (DIMM), which may enable the users to timely replace the potentially faulty DIMM. Such tasks may be performed by a new SMI handler known as the SBCE handler. In accordance with the embodiments of the present disclosure, the hotfix-firmware 120 may be used to register the SBCE handler in the BIOS firmware 108A, if previously it was not available in the BIOS firmware 108A.

In some other example embodiments, at least one driver or code may be executed to modify the one or more parameters of the processor-based system 100. For example, the hotfix-framework 110 may be used to limit the uncore frequency with the help of new SMM driver. Uncore frequency is the frequency of the non-core parts of the CPU, i.e., cache, memory controller, and the like. There are specific model specific registers (MSR) which may be programed to limit the processor uncore frequency. At times, when there are more number of transactions in the uncore, there might be chances of receiving exception, such as machine check exception (MCE) and in order to prevent those exception, a hotfix driver, for example driver or code may be executed by using the hotfix-framework 110, in the BIOS firmware 108A, so as to limit the processor uncore frequency by programming certain MSRs.

FIG. 2A is a block diagram depicting a processor-based system 100A in accordance with one embodiment of the present disclosure. The processor-based system 100A includes a platform hardware 102, a main processor 104, a main memory 106 including a system management (SM) memory 106A and a host memory 106B. The platform hardware 102 is operably coupled to the main processor 104 and the SM memory 106A. The main processor 104 is coupled to the SM memory 106A. The platform hardware 102 is further coupled to the host memory 106B. It should be noted herein, that the processor-based system 100A is substantially similar to a processor-based system 100, illustrated in the embodiment of FIG. 1, where the memory 112 of the processor-based system 100 is the host memory 106B of the processor-based system 100A. In the example embodiment, the SM memory 106A is a dedicated or reserved memory within the main memory 106. The SM memory 106A includes a firmware 108 and a hotfix-framework 110. The firmware 108 and the hotfix-framework 110 are pre-executed in the SM memory 106A during booting of the processor-based system 100A. The hotfix-framework 110 may include a hotfix dispatcher module 110A and a service driver module 110B having one or more boot time resources cached using one or more boot time services during booting of the processor-based system 100A. As discussed in the embodiment of FIG. 1, the platform hardware 102 may be one or more of a management processor or a platform controller hub (PCH). The firmware 108 may be a basic input/output system (BIOS) firmware, a component firmware, or a processor internal firmware.

During operation, user may program/input a hotfix-firmware 120 including updates to the firmware 108 into the processor-based system 100A using the platform hardware 102. In some examples, the hotfix-firmware 120 may include updates to one or more of a basic input/output system (BIOS) firmware, a component firmware, or a processor internal firmware. In particular, the hotfix-firmware 120 includes runtime updates, as discussed herein. The platform hardware 102 may perform signing verification of the hotfix-firmware 120 to validate the integrity of the hotfix-firmware 120 before storing the hotfix-firmware 120 in the host memory 106B. Further, the platform hardware 102 may generate an interrupt to direct the main processor 104 into a system management (SM) mode and get the hotfix-framework 110 notification about the hotfix-firmware 120 in the host memory 106B. In certain embodiments, the platform hardware 102A generates the interrupt (SM interrupt) along with a specific system code, which may be used for notifying the hotfix-framework 110 about the hotfix-firmware 120.

In such embodiments, the main processor 104 may execute the hotfix-framework 110 to execute the hotfix-firmware 120. In particular, upon an event of notification from the platform hardware 102, the hotfix dispatcher module 110A may parse the predetermined memory location, for example, the host memory 106B, detect the newly stored hotfix-firmware 120 in the host memory 106B, read the hotfix-firmware 120, and store the hotfix-firmware 120 into the SM memory 106A. In some embodiments, the hotfix dispatcher module 110A may also perform signing verification of the hotfix-firmware 120 to validate integrity of the hotfix-firmware 120 before storing the hotfix-firmware 120 from the host memory 106B into the SM memory 106A. Additionally, the hotfix dispatcher module 110A may perform the signing verification of the hotfix-firmware 120 after storing the hotfix-firmware 120 in the SM memory 106A. Further, the hotfix dispatcher module 110A may execute the hotfix-firmware 120 stored in the SM memory 106A by utilizing the one or more boot time resources from the service driver module 110B, to apply the updates to the firmware 108 at run time of the processor-based system 100A. In some embodiments, executing the hotfix-firmware 120 may include executing library constructor of linked libraries and module entry point of each hotfix driver in order to execute each driver of the plurality of hotfix drivers.

FIG. 2B is a block diagram depicting a processor-based system 100B in accordance with another embodiment of the present disclosure. The processor-based system 100B includes a platform hardware 102A, a main processor 104, a system management (SM) memory 106A, and a platform hardware memory 106C. The platform hardware 102A is operably coupled to the main processor 104 and the SM memory 106A, and includes a platform hardware memory 106C. The main processor 104 is coupled to the SM memory 106A. It should be noted herein, that the processor-based system 100B is substantially similar to a processor-based system 100, illustrated in the embodiment of FIG. 1, where the memory 112 of the processor-based system 100 is the platform memory 106C. The SM memory 106A includes a firmware 108 and a hotfix-framework 110, which are pre-executed in the SM memory 106A during booting of the processor-based system 100B. The hotfix-framework 110 may include a hotfix dispatcher module 110A and a service driver module 110B having one or more boot time resources cached using one or more boot time services during booting of the processor-based system 100B.

During operation, user may program/input a hotfix-firmware 120 including updates to the firmware 108 into the processor-based system 100B using the platform hardware 102A. In such example embodiments, the platform hardware 102A may perform signing verification of the hotfix-firmware 120 to validate the integrity of the hotfix-firmware 120 before storing the hotfix-firmware 120 into the platform memory 106C. The platform hardware 102A may later generate an interrupt to direct the main processor 104 into a system management (SM) mode and get the hotfix-framework 110 notification about the hotfix-firmware 120 in the platform memory 106C.

In certain embodiments, the platform hardware 102A generates the interrupt along with a specific system code, which may be used for notifying the hotfix-framework 110 about the hotfix-firmware 120. Upon an event of notification from the platform hardware 102A, the hotfix dispatcher module 110A may parse the predetermined memory location, for example, the platform memory 106C, detect the newly stored hotfix-firmware 120 in the platform memory 106C, read the hotfix-firmware 120, and store the hotfix-firmware 120 into the SM memory 106A.

In certain embodiments, the hotfix dispatcher module 110A may perform signing verification of the hotfix-firmware 120 to validate the integrity of the hotfix-firmware 120 before storing the hotfix-firmware 120 from the platform memory 106C into the SM memory 106A. Additionally, the hotfix dispatcher module 110A may once again perform the signing verification of the hotfix-firmware 120 after storing the hotfix-firmware 120 in the SM memory 106A. Further, the hotfix dispatcher module 110A may execute the hotfix-firmware 120 stored in the SM memory 106A by utilizing the one or more boot time resources from the service driver module 110B, to apply the updates to the firmware 108 at run time of the processor-based system 100B. Since, the hotfix-firmware 120 is stored in the platform memory 106C, it is abstracted from possible security attacks through the operating system and applications running on the operating system.

FIG. 2C is a block diagram depicting a processor-based system 100C in accordance with yet another embodiment of the present disclosure. The processor-based system 100C includes a platform hardware 102, a main processor 104, a system management (SM) memory 106A, and a flash memory 106D. The platform hardware 102 is operably coupled to the main processor 104 and the SM memory 106A. The main processor 104 is coupled to the SM memory 106A. The platform hardware 102 is further coupled to the flash memory 106D. It should be noted herein, that the processor-based system 100C is substantially similar to a processor-based system 100, illustrated in the embodiment of FIG. 1, where the memory 112 of the processor-based system 100 is the flash memory 106D. The SM memory 106A includes a firmware 108 and a hotfix-framework 110, which are pre-executed in the SM memory 106A during booting of the processor-based system 100C. The hotfix-framework 110 may include a hotfix dispatcher module 110A and a service driver module 110B having one or more boot time resources cached using one or more boot time services during booting of the processor-based system 100C.

During operation, user may program/input a hotfix-firmware 120 including updates to the firmware 108 into the processor-based system 100C using the platform hardware 102. In such example embodiments, the platform hardware 102 may store the hotfix-firmware 120 into one logical partition of the flash memory 106D and generate an interrupt to direct the main processor 104 into a system management (SM) mode and get the hotfix-framework 110 notification about the hotfix-firmware 120 in the flash memory 106D. In certain embodiments, the platform hardware 102 may verify the signing requirement of the hotfix-firmware 120 and only after that the platform hardware 102 may allow flashing of the hotfix-firmware 120 into the logical partition of the flash memory 106D. In some embodiment, the one logical partition of the flash memory 106D is used to store only the hotfix-firmware including runtimes updates. Another logical partition of the flash memory 106D may store the firmware 108.

Upon an event of notification from the platform hardware 102, the hotfix dispatcher module 110A may parse the predetermined memory location, for example, one logical partition of the flash memory 106D, detect the newly stored hotfix-firmware 120 in the one logical partition of the flash memory 106D, read the hotfix-firmware 120, and store the hotfix-firmware 120 into the SM memory 106A. In certain embodiments, the hotfix dispatcher module 110A may perform signing verification of the hotfix-firmware 120 to validate the integrity of the hotfix-firmware 120 before storing the hotfix-firmware 120 from the flash memory 106D into the SM memory 106A. Additionally, the hotfix dispatcher module 110A may once again perform the signing verification of the hotfix-firmware 120 after storing the hotfix-firmware 120 in the SM memory 106A. Further, the hotfix dispatcher module 110A may execute the hotfix-firmware 120 stored in the SM memory 106A by utilizing the one or more boot time resources from the service driver module 110B, to apply the updates to the firmware 108 at run time of the processor-based system 100C.

In some examples, reading the flash memory 106D to store the data in the SM memory 106D, is a slow operation and may take a few milliseconds to read all hotfix drivers of the hotfix-firmware 120. Thus, the processor-based system 100C may desire to stay in SM Mode for a longer duration of time, which may impact overall performance of the processor-based system 100C and the operating system may stall or crash. As discussed herein, the loading of the hotfix-firmware 120 may be performed during scheduled interrupts rather than single interrupt. Similarly, the execution of the hotfix-firmware 120 may also be performed during scheduled interrupts rather than single interrupt. These features of partially loading and executing the hotfix-firmware 120 during scheduled interrupts may improve the performance of the processor-based system 100C and also prevent stalling or crashing of the operating system running on the processor-based system 100C.

Once the hotfix-firmware 120 is applied at runtime to the processor-based system 100C, and rebooted later, the firmware 108 may determine during the booting process that the hotfix-firmware 120 is present in the flash memory 106D and needs to be applied. In that case, the hotfix-framework 110 may apply the hotfix-firmware 120 before handing over the control to the operating system.

Further, as discussed in the embodiments of FIGS. 1 and 2A-2C, the hotfix-framework 110 used for loading and applying the hotfix-firmware 120 is pre-executed in the SM memory 106A. This feature of having the hotfix-framework 110 pre-executed in the SM memory 106A makes the process of loading and applying the hotfix-firmware 120 agnostic of the operating system.

Figure 3:
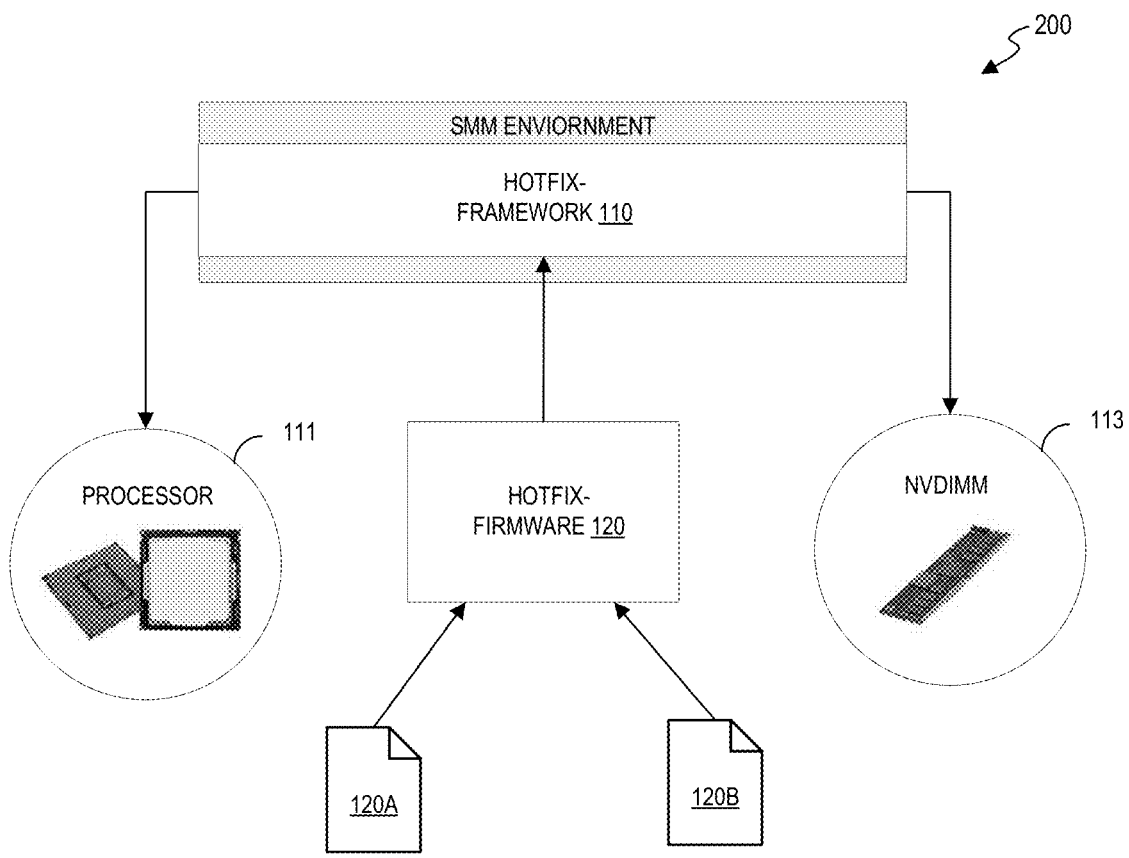
FIG. 3 is a block diagram depicting a hotfix-firmware functioning as a payload carrier to fixes related to a component firmware and a processor internal firmware, in accordance with one embodiment of the present disclosure.

FIG. 3 is a block diagram 200 depicting a hotfix-firmware 120 functioning as a payload carrier in accordance to one embodiment of the present disclosure.

In some example embodiments, the hotfix-firmware 120 including a plurality of hotfix drivers may be used as the payload carrier to transfer updates into secure and trusted system management mode (SMM) environment. In some examples, the hotfix-firmware 120 are flashable binaries and the platform hardware 102 and the hotfix-framework 110 may perform necessary signing verification of the hotfix-firmware, only the trusted and genuine hotfix drivers may get into SMM environment.

In one example embodiment, updates for a processor internal firmware 120A, such as microcode updates from processor vendors may be transferred into the SMM environment using the hotfix-firmware 120. Further, such microcode updates 120A may be applied to processor 111 using the hotfix-framework 110, at runtime. In another example embodiment, updates for a component firmware 120B which is updatable from UEFI, for components like trusted platform module (TPM), non-volatile dual in-line memory module (NVDIMM), Intel Optane, DC persistent memory, and the like, provided there are some hardware support from component vendors to activate updated component firmware 120B at runtime. Further, the hotfix-framework 110, may be used to update the firmware of the hardware component 113, for example, the NVDIMM at runtime.

FIG. 4 is a block diagram 300 depicting a platform hardware 102, a main processor 104, and a machine readable medium 250 encoded with example instructions to load and execute a hotfix-firmware in accordance with one embodiment of present disclosure. The machine readable medium 250 is non-transitory and is alternatively referred to as a non-transitory machine readable medium 250. In some examples, the machine readable medium 250 may be accessed by the platform hardware 102 and the main processor 104.

The machine readable medium 250 may be encoded with example instructions 302 and 304. The instructions 302, 304 of FIG. 4, when executed by the platform hardware 102, may implement aspects of storing the hotfix-firmware including updates to a firmware in a memory of a processor-based system, and generating an interrupt to direct the main processor into a system management (SM) mode and get a hotfix-framework notification about the hotfix-firmware. As discussed herein the memory may be a host memory, or platform hardware memory, or a flash memory, for example.

The instructions 306, when executed, may cause the main processor 104 to execute a hotfix-framework to load the hotfix-firmware from the memory into a system management (SM) memory of the processor-based system. In particular, the instructions 306 may include instructions for a hotfix dispatcher module of the hotfix-framework to parse the memory, locate the hotfix-firmware, read the hotfix-firmware, and store the hotfix-firmware from the memory into the SM memory. Further, in some implementations, the instructions 308, when executed, may cause the main processor 104 to execute the hotfix dispatcher module to execute the hotfix-firmware stored in the SM memory by utilizing the one or more boot time resources to apply the updates to the firmware at runtime of the processor-based system. In particular, the instructions 308 may include instructions for the hotfix dispatcher module to locate a faulty SMM error handler of a BIOS firmware in the SM memory using globally unique identifier (GUID), unregister the faulty SMM error handler, and register a hotfix error handler of the hotfix-firmware with the same GUID, to apply the updates at runtime.

Referring now to FIG. 5, a flow diagram depicting an example method is presented. In some implementations, one or more blocks of these example methods may be executed substantially concurrently or in a different order than shown. In some implementations, a method may include more or fewer blocks than are shown. In some implementations, one or more of the blocks of these example methods may, at certain times, be ongoing and/or may repeat. The method of FIG. 5 may be implemented via use of executable instructions stored on a machine readable medium (e.g., the machine readable media 250) that are executable by a platform hardware 102 and a main processor 104 and/or in the form of electronic circuitry. In some examples, aspects of these method may be performed by the platform hardware 102, the main processor 104, or components thereof.

FIG. 5 is a flow diagram depicting an example method 400 to load and execute a hotfix-firmware at runtime of a processor-based system 100. The method 400 starts at a block 402 and continues to a block 404.

At block 404, the method 400 includes storing the hotfix-firmware including updates to a firmware in a memory of the processor-based system. In the presently contemplated example, a platform hardware, such as a management processor or a platform controller hub may provide an interface for the user to program or input the hotfix-firmware into the memory, such as a host memory, a platform hardware memory, or a flash memory. In some examples, the hotfix-firmware may function as a payload carrier to updates including one or more of a basic input/output system (BIOS) firmware, a component firmware, or a processor internal firmware. The hotfix-firmware may include a plurality of hotfix drivers including the updates to the firmware.

At block 406, the method 400 further includes generating an interrupt to direct a main processor of the processor-based system into a system management (SM) mode to get a hotfix-framework notification about the hotfix-firmware. In the presently contemplated example, the platform hardware may generate the interrupt, such as system management (SM) interrupt to cause the main processor to process the instructions in an SMM environment which is invisible (transparent) to the operating system. Typically, the SMM environment provides trusted and secure execution platform for applying any updates to SMM infrastructure components at runtime without affecting workload running at operating system layer. In some example embodiment, the firmware and the hotfix-framework are pre-executed in the SM memory of the processor-based system while booting the processor-based system. The hotfix-framework may include a hotfix dispatcher module and a service driver module having one or more boot time resources cached in using one or more boot time services during booting of the processor-based system.

Further, at block 408, the method 400 includes loading the hotfix-firmware from the memory into the SM memory. In the presently contemplated example, the main processor may execute the program instructions such that the hotfix dispatcher module may parse the memory, locate the hotfix-firmware in the memory, read the hotfix-firmware, and store the hotfix-firmware into the SM memory.

In some example embodiments, the platform hardware may perform a signing verification of the hotfix-firmware to validate integrity of the hotfix-firmware before loading into the memory and the hotfix-framework may perform the signing verification of the hotfix-firmware to validate integrity of the hotfix-firmware before and after loading the hotfix-firmware into the SM memory. In particular, the signing verification process of the hotfix-firmware may happen at three stages, for example, i) the platform hardware may verify signing of the hotfix-firmware before copying the hotfix-firmware into memory, ii) the hotfix-framework may verify signing of the hotfix-firmware before coping the hotfix-firmware from the memory to the SM memory, and iii) the hotfix-framework may again verifying signing of the hotfix-firmware after coping into SM memory. In some example embodiments, the signing verification may be performed using the combination of public keys and digital certificates. For example, the hotfix-firmware may be signed with private key. It should be noted herein that signing means that a hash of the hotfix-firmware binary may be encrypted using private key and attached to the hotfix-firmware image. Further, a public key may be attached to the hotfix-firmware binary as a digital certificate. It should be noted herein that the digital certificate means public key encrypted with certificate authorities (CA)'s private key. The platform hardware and the hotfix-framework may have CA's public key to verify the integrity of digital certificate. Once the integrity of the digital certificate is verified, the public key may be used to decrypt the encrypted hash attached to hotfix-firmware. Further, the platform hardware and the hotfix-framework would compute the hash of hotfix-firmware image and compare with the decrypted hash. If both matches, that means hotfix-firmware has not been tampered during the copy process and is genuine. Therefore, when the signing verification of the hotfix-firmware passes at all three stages as discussed herein, than the hotfix-framework may know that the hotfix-firmware image copied to the SM memory is not tampered and is genuine. In some embodiments, the hotfix-framework may maintain internal list of all the hotfix-firmware applied to the system at runtime.

In one embodiment, the hotfix-framework may read the host memory to store the hotfix-firmware in the SM memory. In another embodiment, the hotfix-framework may read the platform hardware memory to store the hotfix-firmware into the SM memory. In yet another embodiment, the hotfix-framework may read the flash memory to store the hotfix-firmware into the SM memory. In some examples, the hotfix-framework may store all of the plurality of hotfix drivers into the SM memory during the SM interrupt. However, in some other examples, the hotfix-framework may store the plurality of hotfix drivers into the SM memory during scheduled interrupts. In such example embodiments, loading the hotfix-firmware includes storing at least one hotfix driver of the plurality of hotfix drivers during the interrupt, from the memory into the SM memory, requesting the platform hardware to generate scheduled interrupts, and generating, by the platform hardware, the scheduled interrupts until remaining hotfix drivers of the plurality of hotfix drivers are stored into the SM memory. In some other example embodiments, loading the hotfix-firmware includes storing predetermined size of the plurality of hotfix drivers during the interrupt, from the memory into the SM memory, requesting, the platform hardware to scheduled interrupts, and generating, by the platform hardware, the scheduled interrupts until all of the plurality of hotfix drivers are stored in the SM memory.

At block 410, the method 400 includes executing the hotfix-firmware by utilizing the one or more boot time resources to apply the updates to the firmware at runtime of the processor-based system. In the presently contemplated example, the main processor implements the program instructions such that the hotfix dispatcher module may execute library constructors and module entry point functions corresponding to each of the plurality of hotfix drivers of the hotfix-firmware. In one embodiment, the hotfix dispatcher module may execute the hotfix driver including library constructors and module entry point functions to register at least one new handler to one or more of an existing event or a new event, or modify one or more parameters of the processor-based system. In another embodiment, the hotfix dispatcher module may execute the hotfix driver including library constructors and module entry point functions to i) locate at least one faulty handler in a plurality of pre-executed drivers of the firmware, ii) unregister the at least one faulty handler from an existing event, and iii) register at least one new handler to the existing event. In some embodiments, executing the hotfix-firmware includes executing at least one hotfix driver of the plurality of hotfix drivers during the interrupt, requesting the platform hardware to generate scheduled interrupts, and generating, by the platform hardware, the scheduled interrupts until remaining hotfix drivers of the plurality of hotfix drivers are executed by the hotfix dispatcher module. Further, the method 400 ends at block 412.

The foregoing disclosure describes a number of example implementations for storing and updating the firmware at runtime. The disclosed examples may include systems, devices, computer-readable storage media, and methods for storing and updating the firmware. For purposes of explanation, certain examples are described with reference to the components illustrated in FIGS. 1 and 2A-2C. The functionality of the illustrated components may overlap, however, and may be present in a fewer or greater number of elements and components.

Various features as illustrated in the examples described herein may be implemented to load and apply a hotfix-firmware including updates to a firmware at runtime of a processor-based system. Since, a hotfix-framework used for loading and applying the hotfix-firmware is pre-executed in the SM memory, it makes the system and method for applying the updates agnostic of the operating system. Further, the hotfix-firmware is initially stored in platform hardware memory before storing into the SM memory, which secures the hotfix-firmware from possible security attacks from the operating system and applications running on the operating system. Further, loading and executing the hotfix-framework during scheduled interrupts may prevent stalling of the OS and the associated downtime. The hotfix-firmware may function as a payload carrier for implementing updates to a basic input/output system (BIOS) firmware, a component firmware, or a processor internal firmware.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:
1. A method comprising:
   storing, by a platform hardware, a hotfix-firmware comprising updates to a firmware, into a memory of a processor-based system;
   generating, by the platform hardware, an interrupt to direct a main processor of the processor-based system into a system management (SM) mode and get a hotfix-framework notification about the hotfix-firmware,
   wherein the hotfix-framework and the firmware are pre-executed in an SM memory of the processor-based system, and wherein the hotfix-framework comprises a hotfix dispatcher module and a service driver module comprising one or more boot time resources;
   loading, by the hotfix dispatcher module, the hotfix-firmware from the memory into the SM memory; and
   executing, by the hotfix dispatcher module, the hotfix-firmware by utilizing the one or more boot time resources to apply the updates to the firmware at runtime of the processor-based system,
   wherein the hotfix-firmware comprises a plurality of hotfix drivers comprising the updates to the firmware, wherein executing the hotfix-firmware comprises executing the hotfix driver comprising library constructors and module entry point functions to:
locate at least one faulty handler in a plurality of pre-executed drivers of the firmware;
unregister the at least one faulty handler from an existing event; and
register at least one new handler to the existing event.

2. The method of claim 1, wherein the memory is a host memory of the processor-based system, wherein loading the hotfix-firmware comprises storing the plurality of hotfix drivers from the host memory into the SM memory.

3. The method of claim 1, wherein the memory is a platform hardware memory, wherein loading the hotfix-firmware comprises storing the plurality of hotfix drivers from the platform hardware memory into the SM memory.

4. The method of claim 1, wherein the memory is a flash memory of the processor-based system, wherein loading the hotfix-firmware comprises storing the plurality of hotfix drivers from the flash memory into the SM memory.

5. The method of claim 1, wherein loading the hotfix-firmware comprises:
storing at least one hotfix driver of the plurality of hotfix drivers during the interrupt, from the memory into the SM memory;
requesting the platform hardware to generate scheduled interrupts; and
generating, by the platform hardware, the scheduled interrupts until remaining hotfix drivers of the plurality of hotfix drivers are stored into the SM memory.

6. The method of claim 1, wherein executing the hotfix-firmware comprises executing the hotfix driver comprising library constructors and module entry point functions to register at least one new handler to one or more of an existing event or a new event, or modify one or more parameters of the processor-based system.

7. The method of claim 1, wherein executing the hotfix-firmware comprises:
executing at least one hotfix driver of the plurality of hotfix drivers during the interrupt;
requesting the platform hardware to generate scheduled interrupts; and
generating, by the platform hardware, the scheduled interrupts until remaining hotfix drivers of the plurality of hotfix drivers are executed by the hotfix dispatcher module.

8. The method of claim 1, wherein the hotfix-firmware comprises updates to one or more of a basic input/output system (BIOS) firmware, a component firmware, or a processor internal firmware.

9. The method of claim 1, wherein the one or more boot time resources are cached using one or more boot time services during booting of the processor-based system.

10. The method of claim 1, further comprising performing signing verification of the hotfix-firmware, by one or more of the platform hardware to validate integrity of the hotfix firmware before loading the hotfix firmware into the memory, or the hotfix dispatcher module to validate integrity of the hotfix-firmware before and after loading the hotfix-firmware into the SM memory.

11. A method comprising:
storing, by a platform hardware, a hotfix-firmware comprising updates to a firmware, into a memory of a processor-based system;
generating, by the platform hardware, an interrupt to direct a main processor of the processor-based system into a system management (SM) mode and get a hotfix-framework notification about the hotfix-firmware,
wherein the hotfix-framework and the firmware are pre-executed in an SM memory of the processor-based system, and wherein the hotfix-framework comprises a hotfix dispatcher module and a service driver module comprising one or more boot time resources;
loading, by the hotfix dispatcher module, the hotfix-firmware from the memory into the SM memory,
wherein the hotfix-firmware comprises a plurality of hotfix drivers comprising the updates to the firmware,
wherein loading the hotfix-firmware comprises:
storing predetermined size of the plurality of hotfix drivers during the interrupt, from the memory into the SM memory;
requesting, the platform hardware to generate scheduled interrupts; and
generating, by the platform hardware, the scheduled interrupts until all of the plurality of hotfix drivers are stored in the SM memory; and
executing, by the hotfix dispatcher module, the hotfix-firmware by utilizing the one or more boot time resources to apply the updates to the firmware at runtime of the processor-based system.

12. A method comprising:
storing, by a platform hardware, a hotfix-firmware comprising updates to a firmware, into a memory of a processor-based system;
generating, by the platform hardware, an interrupt to direct a main processor of the processor-based system into a system management (SM) mode and get a hotfix-framework notification about the hotfix-firmware,
wherein the hotfix-framework and the firmware are pre-executed in an SM memory of the processor-based system, and wherein the hotfix-framework comprises a hotfix dispatcher module and a service driver module comprising one or more boot time resources;
loading, by the hotfix dispatcher module, the hotfix-firmware from the memory into the SM memory; and
executing, by the hotfix dispatcher module, the hotfix-firmware by utilizing the one or more boot time resources to apply the updates to the firmware at runtime of the processor-based system,
wherein the hotfix-firmware comprises a plurality of hotfix drivers comprising the updates to the firmware,
wherein executing the hotfix-firmware comprises:
executing at least one hotfix driver of the plurality of hotfix drivers during the interrupt;
requesting the platform hardware to generate scheduled interrupts; and
generating, by the platform hardware, the scheduled interrupts until remaining hotfix drivers of the plurality of hotfix drivers are executed by the hotfix dispatcher module.

* * * * *